Dec. 30, 1924.  
L. J. COSTA  
MOTOR DRIVE  
Filed March 1, 1924   2 Sheets-Sheet 1

1,521,359

INVENTOR  
Louis J. Costa  
BY  
ATTORNEY

Dec. 30, 1924.
L. J. COSTA
MOTOR DRIVE
Filed March 1, 1924
1,521,359
2 Sheets-Sheet 2
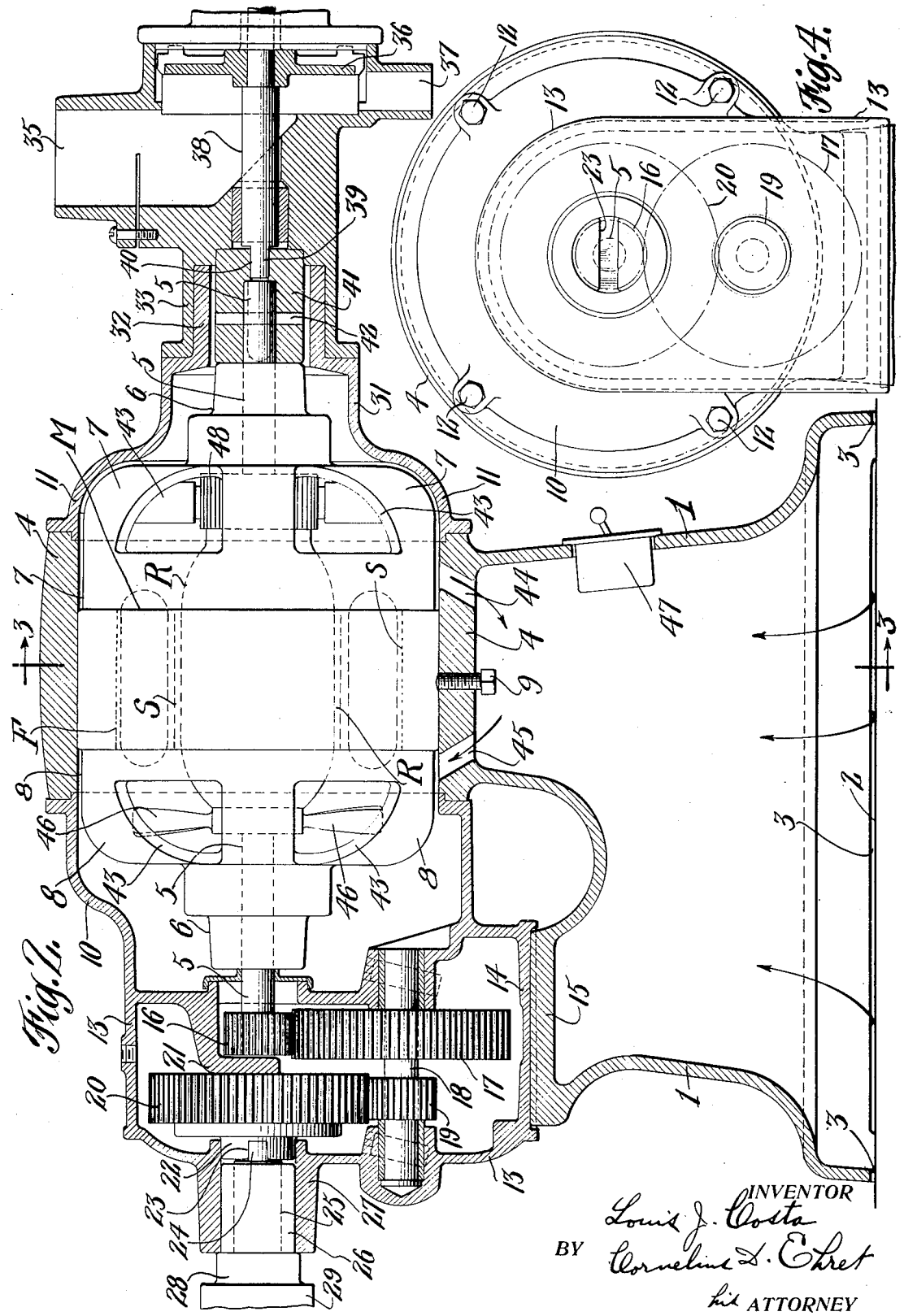

Patented Dec. 30, 1924.

1,521,359

UNITED STATES PATENT OFFICE.

LOUIS J. COSTA, OF PHILADELPHIA, PENNSYLVANIA, ASSIGNOR TO STANDARD ELECTRIC PRODUCTS, INC., OF PHILADELPHIA, PENNSYLVANIA, A CORPORATION OF DELAWARE.

MOTOR DRIVE.

Application filed March 1, 1924. Serial No. 696,170.

*To all whom it may concern:*

Be it known that I, LOUIS J. COSTA, a citizen of the United States, residing in the city and county of Philadelphia, State of Pennsylvania, have invented certain new and useful Improvements in Motor Drives, of which the following is a specification.

My invention relates to electric drives or mountings for electric motors utilized in driving various types of apparatus.

In accordance with my invention an electric motor, comprising yoke or frame, stator, rotor, and end bearing brackets or bells, is mounted, as a unit, within a supporting housing or enclosing member which at its opposite ends is provided with caps or bells independent of the bells or bearing brackets of the motor, upon either or both of which may be supported a machine to be driven by the motor.

Further in accordance with my invention, the motor, particularly when completely or substantially completely enclosed by the supporting housing or structure, is ventilated by recourse to ventilating structure affording air passages communicating with the interior of the base of the enclosing housing.

In accordance with my invention it is possible to utilize various standard makes of motors, thereby avoiding the necessity for special and therefore more costly motors, and further avoiding necessity for changes in mounting and position of the driven apparatus heretofore essential when utilizing motors of standard make or type.

My invention resides in features of construction and combination of the character hereinafter described and claimed.

For an illustration of one of the various forms my invention may take, reference is to be had to the accompanying drawings, in which:

Fig. 2 is a longitudinal vertical sectional view, on larger scale, of apparatus of the character shown in Fig. 1.

Fig. 4 is a fragmentary end elevation of the structure shown in Fig. 2.

Figure 1:
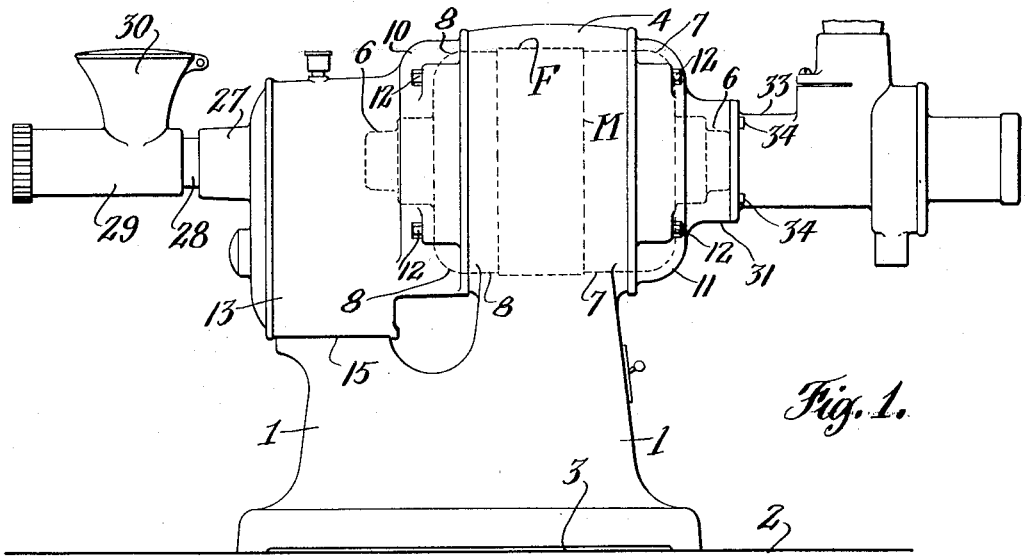
Fig. 1 is a side elevational view of apparatus embodying my invention.
Figure 3:
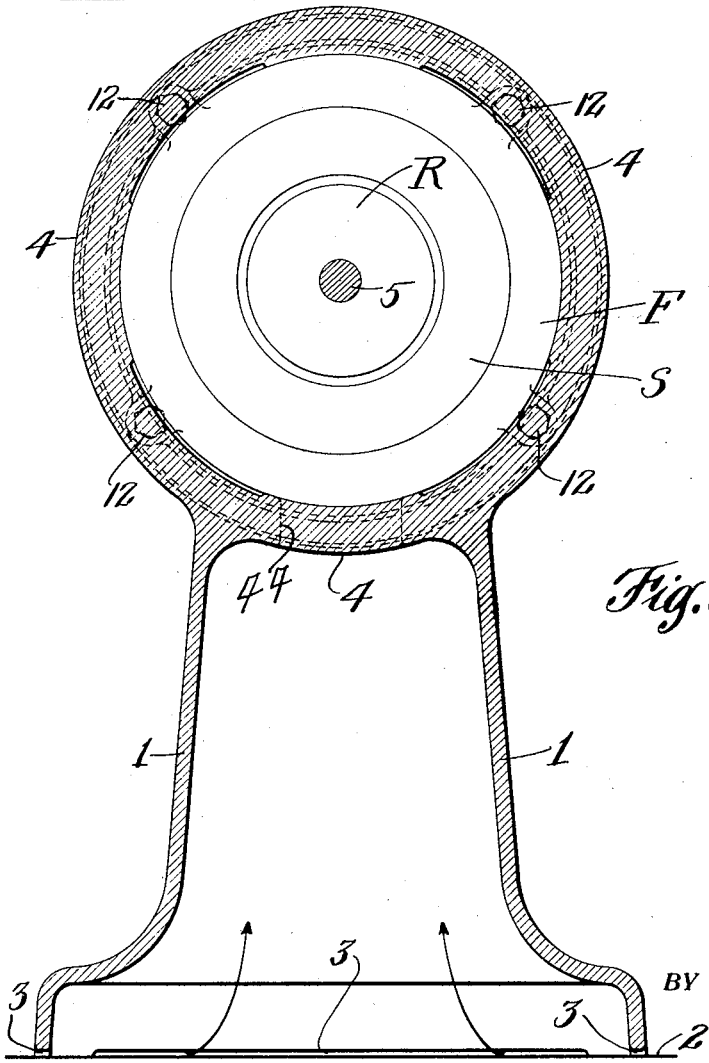
Fig. 3 is a vertical sectional view, taken on the line 3—3 of Fig. 2.

Referring to the drawings, 1 is a hollow base of cast iron or the like having at its lower edge, adjacent the floor, counter or other support 2 the elongated recesses 3 forming passages for circulation of air into and from the interior of the base 1.

At the upper end of the base 1, preferably integral therewith, is the member 4, of circular, cylindrical or other suitable form, constituting both a mounting and enclosure or housing for an electric motor M comprising the field or stator yoke ring or frame F, the stator or field structure S and the rotor or armature structure R mounted upon the shaft 5 having bearings in the hubs or extensions 6 upon the end brackets or bells 7 and 8 carried by and secured to the yoke or frame member F. An electric motor thus constituted is of the usual type and constitutes a complete unit which, in accordance with my invention, may be of standard make and type, in the sense that it may be a standard motor made by the manufacturer for numerous and various uses, and not special to suit it for the particular environment in which it is to be used.

In accordance with my invention a standard motor M, complete as a unit, including its end bells or bearing brackets, and whose base or supporting feet, if any, have been removed, is inserted as a unit into the supporting or housing member 4 which together with the motor forms a combination which greatly simplifies and cheapens manufacture, particularly because special motors, as distinguished from the run of standard motors produced by a manufacturer of motors, are materially more costly than standard or non-special motors. This combination is simpler and cheaper also from the further standpoint that even were a standard motor utilized without the housing 4, there would be necessitated on the part of the manufacturer of apparatus of the general character herein disclosed various changes as regards dimensions, design, arrangement and location of parts, which materially increase the overall cost of manufacture.

By this invention however a standard motor, complete, as a unit, is placed as such within the housing or member 4 which is suitably machined or otherwise formed on its interior to receive the motor frame or yoke F, which may be dressed or turned on its exterior accurately to fit the interior of housing 4. Against yoke F may be adjusted the set screw or bolt 9, and the entire motor unit, complete in itself, requires no other alteration or transformation, and therefore materially cheapens the complete apparatus. While heretofore it has been the practice when using a standard motor to substitute for one or both of the end bells or brackets a new end bell or bracket of special construction suited to the apparatus to be driven by the motor, in accordance with my invention the original bells or end brackets 7, 8 of the motor are retained in the motor unit inserted in the housing 4, and there are provided the additional end bells or brackets 10 and 11 secured, as by bolts 12, to the housing member 4. The apparatus to be driven is supported or carried by these additional members 10 and 11 independently of the motor whose shaft only connects with the driven apparatus, whereby the motor structure, and particularly its bearing bells or brackets 7 and 8, is relieved of the weight of the driven apparatus.

The bracket or bell 10 has formed integral therewith the gear casing 13 the lower end 14 of which may rest upon or be secured to the pedestal 15 preferably secured to or integral with the base 1.

The motor shaft 5 extends beyond the hub 6 of the motor bell or bracket 8 and has secured thereon the pinion 16 meshing with and driving the gear 17 secured upon the shaft 18 having bearings supported by the case 13. Secured upon the shaft 18 is a pinion 19 meshing with and driving the gear 20 supported by the internal bracket 21 and having the hub or extension 22 provided with a slot 23 adapted to receive a similarly shaped tongue 24 on the end of the shaft 25 having a bearing within the hub or sleeve 26 received in the hub or sleeve 27 on the gear case 13. The sleeve 26 is integral with the casing 29 of any suitable apparatus to be driven by the motor M. In the example illustrated this apparatus is a meat grinder or chopper having the hopper 30 into which the meat is fed to cutting or grinding mechanism within casing 29 and driven by the shaft 25 having the tongue 24. The meat grinding apparatus or other mechanism is accordingly applied to and supported as a unit by the gear casing 13 in detachable driving relation to the gear 20 driven by the motor shaft 5.

The end cap or bell 11 is provided with the portion 31 of reduced diameter enclosing and housing the hub 6 of the motor bracket 7. Integral with the member 31 is the sleeve 32 over which fits a sleeve 33, secured to the member 31 by bolts 34 of another mechanism or apparatus to be driven by the motor M. In the example illustrated this apparatus is a coffee grinder into which the coffee beans are delivered through the passage 35 to the mill or grinding mechanism 36 delivering the ground coffee through the aperture 37.

The grinding mechanism is driven by the shaft 38 having at its end the tongue 39 received in a similarly shaped slot 40 in the sleeve or bushing 41 secured to the motor shaft 5 as by pin 42. This structure forms a detachable coupling between the motor shaft 5 and the shaft 38 which latter is a part of the coffee mill unit which is applied as such to the sleeve 32 of the housing bell or cap 11.

When two apparatus are driven from opposite ends of the motor as herein disclosed, the standard motor shaft 5, terminating at its right end, Fig. 2 at the right end of bearing 6, has added thereto by the maker of my apparatus a suitable length to effect the second drive.

For purposes of ventilation of the motor M its end caps or bells 7 and 8 may have openings 43 affording passages for air to or from the motor parts enclosed within or between the bells 7 and 8. The region within the bells 7 and 8 is accordingly in communication through the passages 43 with the space enclosed by the housing member 4 and its caps or bells 10 and 11, permitting circulation of air. That portion of the housing ring or member 4 adjacent the space within the base 1 may be provided with suitable air passages 44, 45 whereby the interior of the motor is in communication with the space within the base 1 through the aforesaid passages 43 and the passages 44 and 45, effecting circulation from the space within the base 1 to the space within the housing structure to the space within the motor and thence back to the space within the base 1, which latter is in communication with the outer atmosphere through the aforesaid passages 3. It shall be understood, however, that the caps or bells 10 and 11, or either of them, may have openings to the outer atmosphere.

When suitable or desirable there may be provided within the motor unit M itself a fan 46, or equivalent, for effecting a forced circulation through the motor, and by the pasages 43, 44 and 45 a greater amount of circulation, indicated by the arrows, is available to and from the space within the base 1.

Carried by any suitable part of the structure, as by the base 1, is a switch 47 for controlling the motor M. The conductors, not shown, leading from the switch 47 to the motor M may extend through an air passage as 44, to the interior of the bracket or bell 7 and there connected as usual with the motor.

It will be understood that the motor M may utilize either direct or alternating current, and may be of a type either with or without a commutator 48.

What I claim is:

1. The combination with a supporting housing of a motor comprising stator, rotor and bearing bracket structure all assembled to form a motor unit disposed within and supported by said housing, bell or cap structure independent of said motor bracket structure and secured to said supporting housing, and a machine carried by said bell or cap structure independently of said motor and driven thereby.

2. The combination with a base member, of a housing member open at its ends and carried by said base member, a motor comprising stator, rotor and bearing bracket structure all assembled to form a motor unit disposed within and supported by said housing member, bell or cap members independent of said motor unit secured on opposite ends of said housing member and therewith enclosing said motor unit, and a machine carried by a bell or cap member independently of said motor and driven thereby.

3. The combination with a base member, of a housing member open at its ends and carried by said base member, a motor comprising stator, rotor and bearing bracket structure all assembled to form a motor unit disposed within and supported by said housing member, bell or cap members independent of said motor bracket structure secured on opposite ends of said housing member and therewith enclosing said motor unit, and a machine driven by said motor unit and carried by a bell or cap member and independently thereof by said base member.

4. The combination with a supporting housing, of a motor comprising stator, rotor and bearing bracket structure assembled to form a motor unit disposed within and supported by said housing, bell or cap structure independent of said motor unit and secured to said supporting housing, a gear case carried by said bell or cap structure, gearing in said case, and a machine carried by said gear case and driven by said motor through said gearing.

5. The combination with a housing member, of a base therefor, a motor comprising stator, rotor and bearing bracket structure assembled to form a motor unit disposed within and supported by said housing member, bell or cap structure independent of said motor unit secured to said housing member, a gear case on said bell or cap structure and carried by said base independently of said housing member, gearing in said case, and a machine carried by said gear case and driven by said motor through said gearing.

6. The combination with a hollow base member, of a housing member, a motor comprising stator, rotor and bearing bracket structure all assembled to form a motor unit disposed within and supported by said housing member, bell or cap structure independent of said motor unit secured to said housing member and therewith enclosing said motor unit, a machine carried by said cap or bell structure and driven by said motor, and means effecting communication between the hollow portion of said base member and the space enclosed by said housing member and bell or cap structure for permitting passage of air.

7. The combination with a base member enclosing a space in communication with the atmosphere, of a housing member carried by said base member, a motor comprising stator, rotor and bearing bracket structure assembled to form a motor unit disposed within and carried by said housing member, and cap or bell structure independent of said motor unit secured to said housing member and therewith enclosing said motor unit, said housing member having an aperture effecting communication between the space within said base member and a space enclosed by said housing member and said bell or cap structure for permitting passage of ventilating air.

8. The combination with a base member enclosing a space in communication with the atmosphere, of a housing member carried by said base member, a motor comprising stator, rotor and bearing bracket structure assembled to form a unit disposed within and carried by said housing member, and cap or bell structure independent of said motor unit secured to said housing member and therewith enclosing said motor unit, said housing member having apertures spaced from each other and effecting communication between the space within said base member and the space enclosed by said housing member and said cap or bell structure.

9. The combination with a base member enclosing a space in communication with the atmosphere, of a housing member carried by said base member, a motor comprising stator, rotor and bearing bracket structure assembled to form a unit disposed within and carried by said housing member, cap or bell structure independent of said motor unit secured to said housing member and therewith enclosing said motor unit, said housing member having apertures spaced from each other and effecting communication between the space within said base member and the space enclosed by said housing member and said cap or bell structure, and air impelling means comprised in said motor unit, said bearing bracket structure provided with means for effecting passage of air between the interior of said motor unit and said space enclosed by said housing member and said cap or bell structure.

10. The combination with a housing whose inner wall is of substantially circular contour, of a motor comprising a frame substantially conforming on its exterior with said wall, stator, rotor and bearing bracket structure secured to said frame and all assembled to form a motor unit disposed within said housing member, cap or bell structure independent of said motor unit secured to said housing member and therewith enclosing said motor unit, and a machine carried by said cap or bell structure and driven by said motor.

In testimony whereof I have hereunto affixed my signature this 28th day of February, 1924.

LOUIS J. COSTA.